(12) United States Patent
Bahr et al.

(10) Patent No.: US 7,027,356 B2
(45) Date of Patent: Apr. 11, 2006

(54) METHOD AND DEVICE FOR DETECTING OBJECTS, ESPECIALLY USED AS A PARKING ASSISTANCE DEVICE IN A MOTOR VEHICLE

(75) Inventors: Ulrich Bahr, Braunschweig (DE); Ernst Lissel, Wolfsburg (DE); Axel Schoft, Braunschweig (DE); Stephanus Buettgenbach, Sickte (DE)

(73) Assignee: Volkswagen AG, Wolfsburg (DE)

( * ) Notice: Subject to any disclaimer, the term of this patent is extended or adjusted under 35 U.S.C. 154(b) by 21 days.

(21) Appl. No.: 10/646,920

(22) Filed: Aug. 22, 2003

(65) Prior Publication Data

US 2004/0218471 A1    Nov. 4, 2004

Related U.S. Application Data

(63) Continuation of application No. 09/762,456, filed as application No. PCT/EP99/05378 on Jul. 21, 1999, now Pat. No. 6,690,616.

(30) Foreign Application Priority Data

Aug. 6, 1998 (DE) ................. 198 35 600
Jan. 19, 1999 (DE) ................. 199 01 847

(51) Int. Cl.
*G01S 15/93* (2006.01)
(52) U.S. Cl. ........................... 367/99; 367/87
(58) Field of Classification Search ............ 367/87, 367/99, 118, 129, 909; 340/435, 436, 903, 340/932.2
See application file for complete search history.

(56) References Cited

U.S. PATENT DOCUMENTS

| | | | |
|---|---|---|---|
| 3,953,131 A | 4/1976 | Ernst | |
| 4,614,945 A | 9/1986 | Brunius et al. | |
| 4,845,682 A | 7/1989 | Boozer et al. | |
| 5,173,881 A | 12/1992 | Sindle | |
| 5,229,975 A | 7/1993 | Truesdell et al. | |
| 5,315,517 A | 5/1994 | Kawase et al. | |
| 5,317,320 A | 5/1994 | Kingsbury et al. | |
| 5,424,726 A * | 6/1995 | Beymer | 340/902 |
| 5,761,155 A * | 6/1998 | Eccardt et al. | 367/99 |
| 5,946,273 A | 8/1999 | Lissel et al. | |
| 6,199,173 B1 | 3/2001 | Johnson et al. | |

FOREIGN PATENT DOCUMENTS

| | | |
|---|---|---|
| DE | 29 14 031 | 1/1981 |
| DE | 37 01 521 | 8/1988 |
| DE | 38 06 847 | 9/1989 |
| DE | 38 21 577 | 1/1990 |
| DE | 44 25 419 | 12/1995 |
| EP | 0 825 585 | 2/1998 |

* cited by examiner

*Primary Examiner*—Ian J. Lobo
(74) *Attorney, Agent, or Firm*—Kenyon & Kenyon

(57) ABSTRACT

A device for detecting objects, especially used as a parking assistance device in a motor vehicle, includes a plurality of distance sensors, at least one microcontroller configured to control the distance sensors and an output unit. The distance sensors emit a signal in accordance with an identifier that is modified over time by the microcontroller.

25 Claims, 5 Drawing Sheets a)

b)

c)

d)

e)

f)

g)

METHOD AND DEVICE FOR DETECTING OBJECTS, ESPECIALLY USED AS A PARKING ASSISTANCE DEVICE IN A MOTOR VEHICLE

CROSS-REFERENCE TO RELATED APPLICATIONS

This application is a continuation of U.S. patent application Ser. No. 09/762,456, filed on Apr. 11, 2001, now U.S. Pat. No. 6,690,616, which was a National Stage application of PCT International Application No. PCT/EP99/05378, filed Jul. 21, 1999 each of which is expressly incorporated herein in its entirety by reference thereto.

FIELD OF THE INVENTION

The present invention relates to a method and a device for detecting objects, especially used as a parking assistance device in a motor vehicle, including a number of distance sensors, at least one microcontroller that controls the distance sensors, and an output unit.

BACKGROUND INFORMATION

Many different devices which, e.g., function on the basis of radar, lasers, or ultrasound, are used to detect objects, and in particular, to measure distance. Because of their very high resolution, ultrasonic sensors are especially useful in close range.

For example, such a device is described in German Published Patent Application No. 44 25 419, having a rear-side transmitting and receiving arrangement; a front-side transmitting and receiving arrangement, which includes at least one transmitting and receiving unit in the middle of the front area, and a transmitting and receiving unit in each of the front corner areas; a control unit for activating and deactivating the transmitting and receiving arrangement; and acoustic and/or optical warning elements, which generate warning signals as a function of the output signals of the transmitting and receiving arrangements, in response to the transmitting and receiving arrangements being activated; both the front-side and rear-side transmitting and receiving arrangements being activated as long as the reverse gear is active, and the vehicle speed does not exceed a first threshold value. On the other hand, only the front-side transmitting and receiving arrangement is activated as long as the reverse gear is not engaged and the driving speed does not exceed a predefined second threshold value. The two transmitting and receiving arrangements are deactivated in all other driving conditions.

In the case of motor vehicles, measuring distance using ultrasonic transducers as a parking assistant, or measuring distance to detect lateral obstacles is based on measuring the echo time of the sound. For this purpose, a transducer mounted on the motor vehicle emits a signal that is reflected by an obstacle. This echo can be received by additional transducers mounted on the motor vehicle. Either short wave trains or a continuous wave train provided with a fixed or random identifier are used as a transmitted signal. The echo time of the short wave train is directly determined from the time at which it arrives at the receiver. In the case of a continuous wave train, the echo time is measured by correlating the emitted and the received signals.

The problem of using such systems is that two vehicles can interfere with each other. In this case, false identifications of obstacles can result when the transmitted signal of the one motor vehicle is incorrectly interpreted by the other as an echo of its own transmitted signal. This can lead to a non-existing obstacle being detected, or worse, an obstacle not being detected because the weak echoes are masked by a strong interference signal of another motor vehicle, which may occur when the amplitude of the received signal is regulated and the setting time is in the order of magnitude of a measuring cycle. A strong interference signal causes a low amplification of the amplitude regulation device AGC so that a weak echo is not sufficiently amplified to detect an obstacle with certainty.

An additional problem occurs when two or more transducers on a vehicle transmit at the same time, in order to, e.g., increase the measuring rate. Even when the transmitting transducers are spatially separated in such a manner, their transmitted echoes are normally only received by different receiver groups. Thus, it cannot be ruled out that signal echoes reach an unintended receiver group, when an unfavorable arrangement of obstacles or an unfavorable orientation of their surfaces exists. This can also lead to false identification of obstacles. Solution options include detecting these mutual interferences (signal collision detection) or preventing these mutual interferences (signal collision prevention). Signal collision prevention has the advantage of the obstacle detection not being interrupted by another transmitter.

Therefore, it is one object of the present invention to provide a method and a device for detecting objects, in which other sources are prevented from influencing the measurement accuracy.

SUMMARY

The above and other beneficial objects of the present invention are achieved by providing distance sensors with an identifier that can vary over time, to reliably and unequivocally assign the received signals to the sources, when a possible source of interference does not change its identifier in the exact same manner, over time.

Using a random function to control the change of the identifier over time minimizes the occurrence of two sources coinciding, whose identifiers vary over time in the same manner.

To prevent the problem of masking caused by the sensors on the same vehicle, these sensors may likewise be given a variable identifier, either each sensor receiving a sensor-specific identifier, or else the sensors being combined into groups. It is also possible to allow the sensors to operate in groups, at different carrier frequencies.

When using the device as a parking assistance device, the distance sensors may include more particularly ultrasonic transducers, and especially developed as ultrasonic foil transducers, which may be operated in another frequency range and have high resolution.

DETAILED DESCRIPTION

Figure 1:
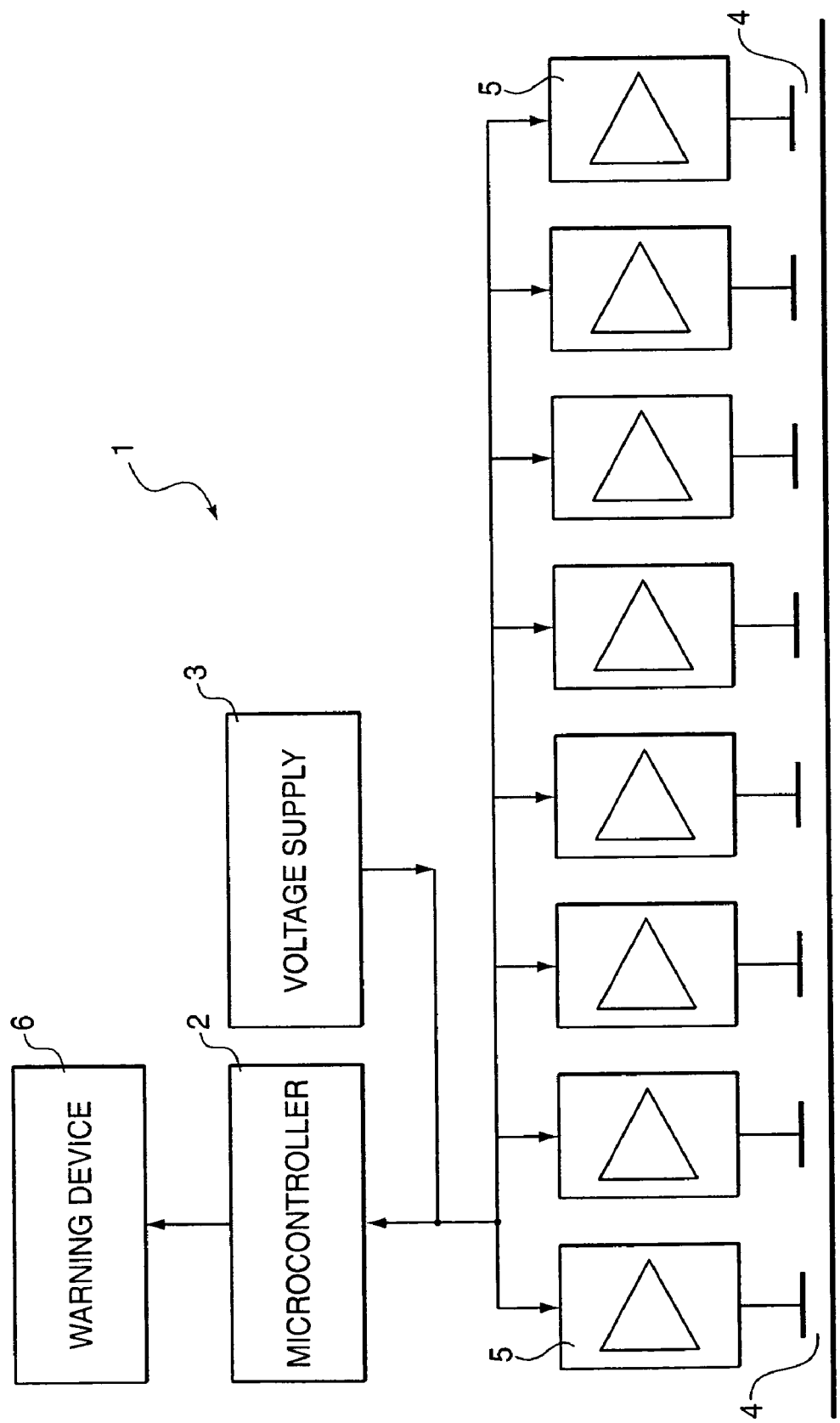
FIG. 1 is a schematic diagram of a device for detecting objects according to the present invention.
Figure 2:
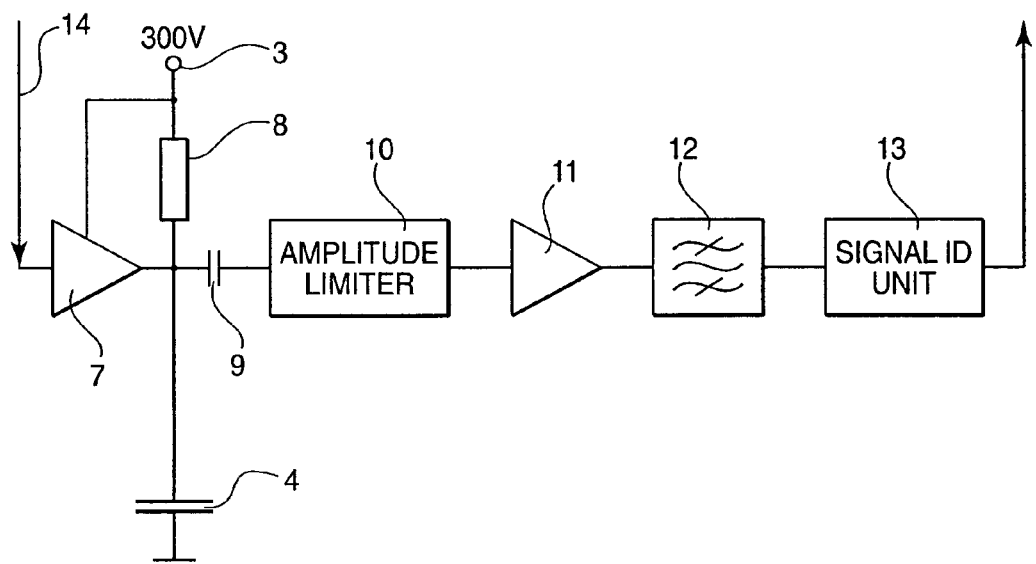
FIG. 2 is a circuit diagram of a transmitter-receiver circuit thereof.

Device 1 for detecting objects includes a microcontroller 2, a voltage supply 3, a plurality of ultrasonic transducers 4, a transmitter-receiver circuit 5 assigned to respective ultrasonic transducers 4, and an optical and/or acoustic warning device 6. In this case, microcontroller 2 has various functions. First, it marks the transmitted signals of ultrasonic transducer 4 with an identifier that is variable over time, and second, it evaluates the received signals of ultrasonic transducer 4, after the echo time, and ascertains the distances of objects from these evaluations. The marking of the identifier and the evaluation will be described below in detail. In addition, microcontroller 2 controls optical and/or acoustic warning device 6. For example, the warning device may include a display on which the current distance to the objects is indicated alphanumerically. The distance may be acoustically output, using a voice output unit, or using signal tones of varying frequency and/or volume. Referring to FIG. 2, the sequence control system will now be explained below, for a transmitter-receiver circuit 5 and an ultrasonic transducer 4.

Transmitter-receiver circuit 5 includes a send amplifier 7, a dropping resistor 8, a decoupling capacitor 9, an amplitude limiter 10, an amplifier 11, a demodulator 12, and a signal identification unit 13. If device 1 is now activated, then microcontroller 2 impresses a transmitted signal on ultrasonic transducer 4, having an identifier that can change over time. Microcontroller 2 then generates a corresponding electrical signal 14 and supplies it to send amplifier 7. Depending on the type of electrical signal 14 to be used, microcontroller 2 generates signal 14 directly or by a function generator or an oscillator that can be modulated. This electronic signal 14 is amplified by send amplifier 7, and on the basis of the changing electric field, it causes ultrasonic transducer 4 to emit ultrasonic waves in accordance with the frequency spectra of electrical signal 14. In this context, voltage supply 3 supplies the operating voltage for both send amplifier 7 and ultrasonic transducer 4. Resistor 8 provides a bias voltage at transducer 4, and the resistor is so large that the electric charge at transducer 4 nearly remains constant in receiving mode in response to an ultrasonic wave being received at transducer 4, the change in its capacitance forms an electrical signal that is supplied to the input of amplitude limiter 10. Decoupling capacitor 9 provides d.c. voltage decoupling from input amplifier 7 and ultrasonic transducer 4. The a.c. voltage signal, which is limited in amplitude and is at the output of amplitude limiter 10, is amplified by amplifier 11 and demodulated in demodulator 12, i.e., the identifier of the received signal is separated. Since the change of the transmitted-signal identifier over time is known, a comparison may be used to check if the received signal is an echo of the transmitted signal or if it originates from another ultrasonic source.

Figure 3:
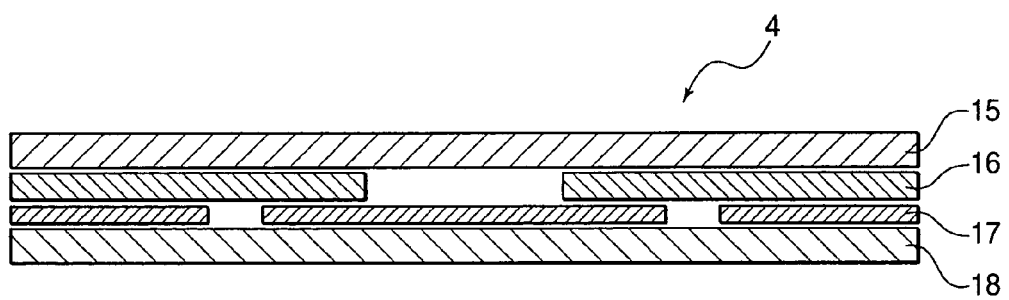
FIG. 3 is a cross-sectional view of an ultrasonic foil-transducer thereof.

A cross-section of ultrasonic foil-sandwich transducer 4 is represented in FIG. 3. Ultrasonic foil-sandwich transducer 4 includes a conductive covering foil 15 that may be dyed, a patterned spacer foil 16, a transducer electrode 17, and a plastic bumper 18 or lateral ramming protector. Thus, such an ultrasonic foil-sandwich transducer 4 is optically adapted to the body of a motor vehicle in an optimal manner and is almost invisible. For example, transducer electrode 16 can take the form of conductive lacquer. Instead of patterned spacer foil 16, the clearance may also be provided by a pattern that is produced using silk-screen printing.

Figure 4A:
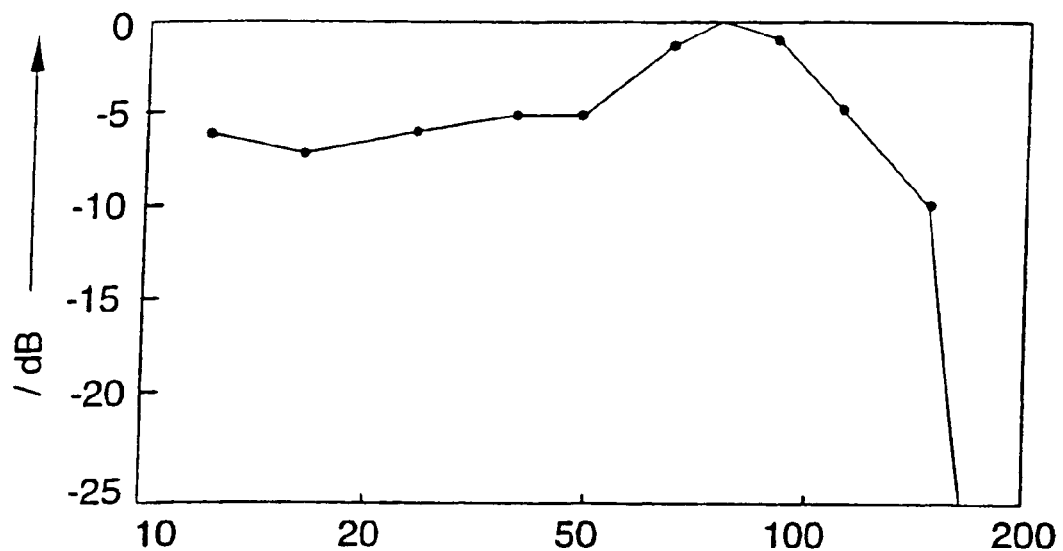
FIG. 4a is a graph illustrating an amplitude characteristic of a 12 µm ultrasonic foil transducer.
Figure 4B:
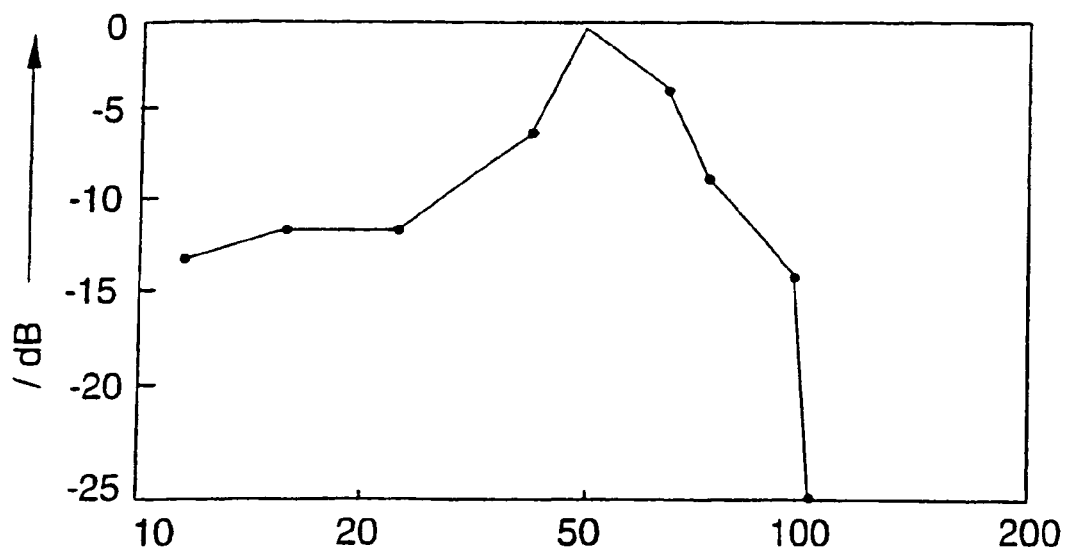
FIG. 4b is a graph illustrating an amplitude characteristic of a 24 µm ultrasonic foil transducer.

The advantage of ultrasonic foil transducers 4 over other transducers is the large frequency range in which they are operable. FIG. 4a represents an example of the receiving amplitude of an echo signal verses the frequency, for an ultrasonic foil transducer 4 having a 12 μm foil. The object is at a distance of 1.40 m and has a smooth surface, and the receiving amplitude has been normalized to 0 dB at the resonance frequency. It is apparent from FIG. 4a that, over a wide frequency range, the receiving amplitude is attenuated by less than 10 dB in relation to resonance. FIG. 4b represents the receiving amplitude at the same measuring conditions, for an ultrasonic foil transducer 4 having a 24 μm foil.

Figure 5:
FIGS. 5a–g illustrate modulations of a transmitted signal.
Figure 5:
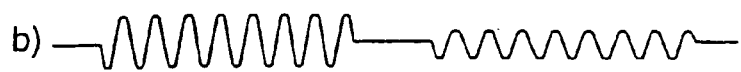
Figure 5:
Figure 5:
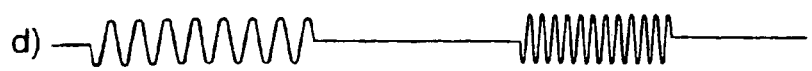
Figure 5:
Figure 5:
Figure 5:

Electrical signal 14 is preferably modulated, in order to impress the variable, time-related identifier. In principle, all types of modulation known from telecommunications engineering are taken into consideration. The carrier signal to be modulated, i.e., the fundamental frequency at which ultrasonic transducer 4 transmits, is made up of wave trains; depending on the selected type of modulation, the modulation being possible inside a wave train or over several wave trains. FIG. 5a represents an amplitude modulation inside one wave train, and FIG. 5b represents an amplitude modulation over several wave trains.

However, since the amplitude of the echo signal is also a strong function of the distance and the reflection conditions, the receiving amplitudes should be evaluated relative to each other. Furthermore, it is necessary to amplify the received signal, using an automatic gain-control amplifier (AGC), to prevent the signal from being amplified to the limit and, thus, to prevent the amplitude formation from being lost. To increase the signal-to-noise separation, it may also be necessary to limit the frequency band width.

Even the frequency can be modulated, both inside a wave train (FIG. 5c) and over several wave trains (FIG. 5d). The received signal may be amplified to the limit, since the information lies in the signal frequency. The demodulation is performed out by a high-quality band-pass filter or, in general, using a frequency analysis. Relative movements of the obstacles may cause frequency shifts (Doppler Effect). For reliable operation, the frequency increase of the modulation should be larger than such a frequency shift.

The phase modulation is only practicable inside one wave train (FIG. 5e), since the basic phase angle of the input signal varies with the distance to the obstacle, and therefore, only a relative phase angle or phase change can be evaluated. In pulse-length modulation (FIG. 5f) and mark-space modulation (FIG. 5g), the length of several wave trains and the space between several wave trains are changed, respectively. The length, and especially, the spacing of the wave trains are changed by a relative movement of the obstacle. The aforementioned types of modulation may also be combined in part.

In order to detect whether two systems are interfering with each other, it is necessary to provide the emitted signals with different identifiers, which may be performed using the aforementioned types of modulation. These identifiers may be selected and varied at random, in order to rule out that two systems have the same identifier. If an interference signal is received from another motor vehicle, then the measurement may be acknowledged as being invalid, in view of the unknown identifier. The identifier is destroyed in response to two signals being superimposed at the receiver, this being detected as well. It may not be possible to obtain a valid measurement during such interference. Therefore, the emission of signals may be interrupted for a certain period of time, in order to enable the other system to perform valid measurements. In order that two systems do not simultaneously discontinue their measurements, and then interfere with each other again, the delay time may likewise be controlled so as to be selected randomly.

By using different transmitting frequencies, which may be selectively processed by the receivers when the frequencies are spaced sufficiently far apart, it is possible to operate with two systems simultaneously, without interference with each other. Therefore, it is also possible for several transducers on a motor vehicle to transmit simultaneously, in order to, e.g., increase the measuring rate. Because of the very limited number of transmitting frequencies, each side (front, rear, left, right) of the vehicle may be assigned one or more fixed transmitting frequencies. Since two vehicles which, for example, are parking at the same time, are also pointed generally in the same direction of travel, no mutual interference will result. The method offers the significant advantage of not allowing a measurement to be interrupted by another transmitter, as long as different transmitting frequencies are used. But because of the limited number of transmitting frequencies, this is not always the case. Therefore, it may also be necessary to be able to detect mutual interference, if it exists. To this end, an additional identifier is modulated to the transmitted signals that have different carrier frequencies. To avoid having to give each vehicle a separate identifier, the identifier may be changed randomly during operation. If two systems now transmit on the same frequency and mutually interfere, then this is detected, and the systems change their transmitting frequencies. The new transmitting frequency should be selected randomly, in order to prevent the two systems from operating on the same transmitting frequency again.

Figure 6:
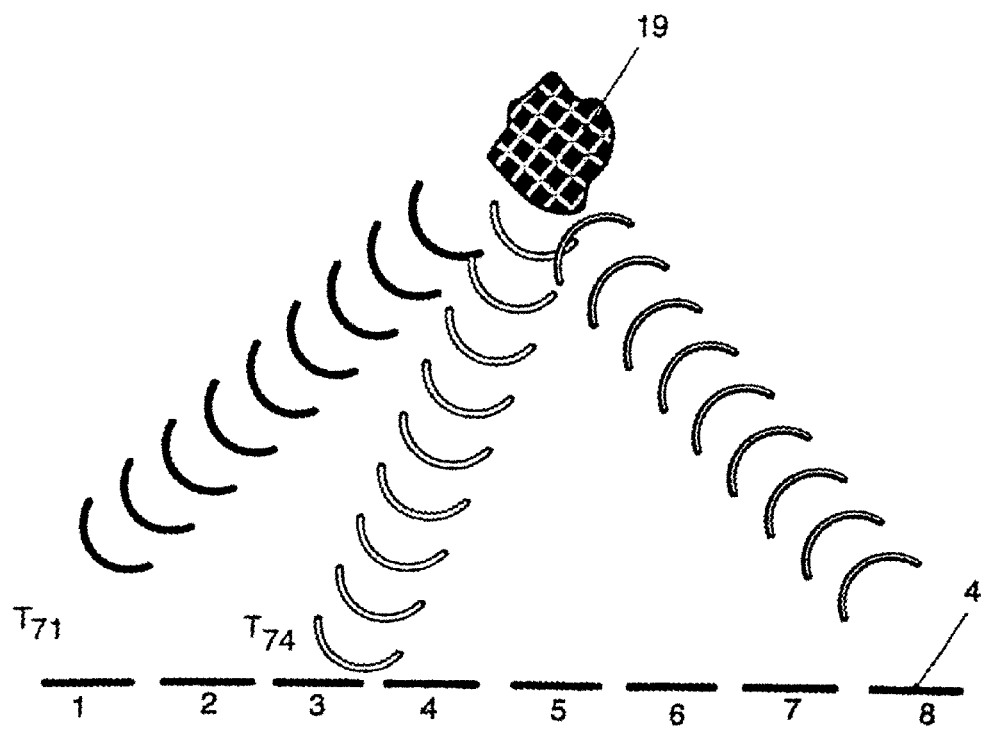
FIG. 6 is a schematic view illustrating a receiving arrangement.
Figure 7:
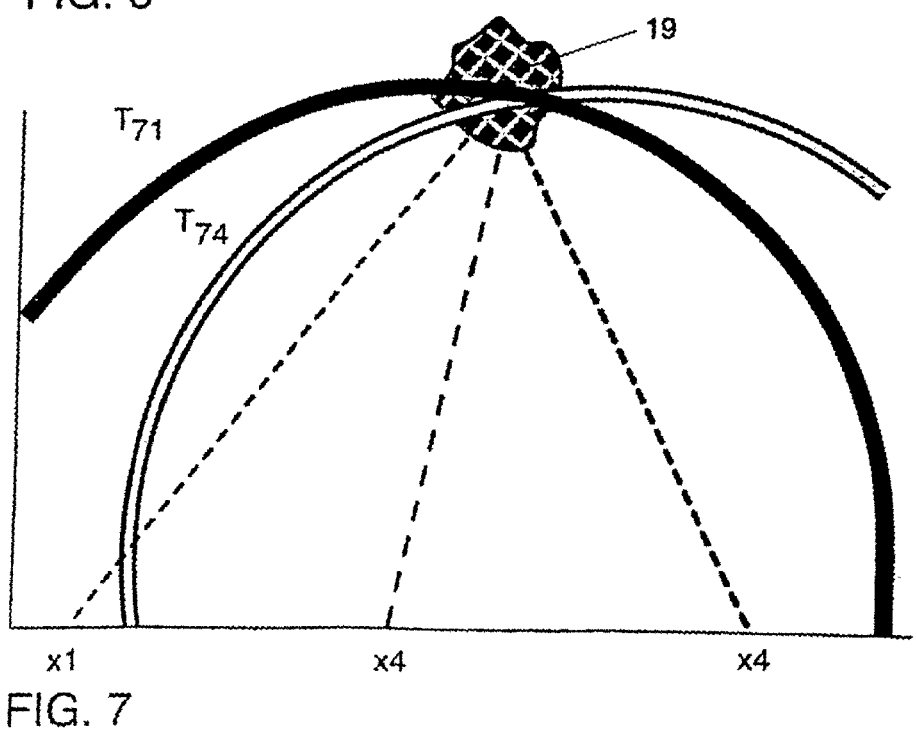
FIG. 7 is a schematic view illustrating a distance determination.

The detection of the distance and the position of an object 19 will now be explained, with reference to FIG. 6 and 7. It is assumed that eight ultrasonic transducers 4 emit and receive ultrasonic waves. Thus, 64 possible paths exist. In FIG. 6, seventh ultrasonic transducer 4 is in transmitting mode, and two out of eight possible paths to first and forth ultrasonic transducers 4 are displayed. The most probable location of object 19, which is represented in FIG. 7 for the two paths from FIG. 6, results from superimposing the ellipse equations that can number up to 64.

What is claimed is:

1. A device for detecting objects, comprising:
   at least one distance sensor configured to emit a transmitting signal and to receive returned transmitting signal;
   at least one microcontroller configured to control each distance sensor; and
   an output unit;
   wherein the microcontroller is configured to apply to the transmitting signal an identifier signal that is changeable with time and to distinguish between returned transmitting signal output and other signals received by the device based on the identifier.

2. The device according to claim 1, wherein the device is a parking assistance device for a motor vehicle.

3. The device according to claim 1, wherein the change of the identifier signal with time is generated in accordance with a random function.

4. The device according to claim 1, wherein the change of the identifier signal with time is generated in accordance with a random number generator.

5. The device according to claim 1, wherein the microcontroller is configured to control the distance sensors individually in accordance with variable identifier signals.

6. The device according to claim 1, wherein the microcontroller is configured to control the distance sensors in groups in accordance with variable identifier signals.

7. The device according to claim 1, wherein each distance sensor includes an ultrasonic transducer.

8. A device for detecting objects, comprising:
   at least one distance sensor configured to emit a transmitting signal and to receive returned transmitting signal;
   at least one microcontroller configured to control each distance sensor; and
   an output unit;
   wherein the microcontroller is configured to apply to the transmitting signal an identifier that is changeable with time and to distinguish between returned transmitting signal output and other signals received by the device based on the identifier; and
   wherein each distance sensor includes an ultrasonic foil transducer.

9. The device according to claim 8, wherein the ultrasonic foil transducer includes an ultrasonic foil sandwich transducer.

10. The device according to claim 1, wherein the microcontroller is configured to interrupt emission of the transmission signal from the distance sensor for a predetermined amount of time when the other signals are received by the same distance sensor.

11. The device according to claim 1, wherein the identifier signal includes a modulation of the transmitting signal.

12. The device according to claim 11, wherein the modulation includes at least one of an amplitude modulation, a frequency modulation, a phase modulation, a pulse-length modulation and a mark-space modulation.

13. A device for detecting objects, comprising:
   a plurality of distance sensors;
   at least one microcontroller configured to control each of the distance sensors; and
   an output unit;
   wherein the microcontroller is configured to apply to the distance sensors an identifier signal that is changeable with time.

14. The device according to claim 13, wherein the device is a parking assistance device for a motor vehicle.

15. The device according to claim 13, wherein the change of the identifier signal with time is generated in accordance with a random function.

16. The device according to claim 13, wherein the change of the identifier signal with time is generated in accordance with a random number generator.

17. The device according to claim 13, wherein the microcontroller is configured to control the distance sensors individually in accordance with variable identifier signals.

18. The device according to claim 13, wherein the microcontroller is configured to control the distance sensors in groups in accordance with variable identifier signals.

19. The device according to claim 13, wherein each distance sensor includes an ultrasonic transducer.

20. The device according to claim 13, wherein each distance sensor includes an ultrasonic foil transducer.

21. The device according to claim 20, wherein the ultrasonic foil transducer includes an ultrasonic foil-sandwich transducer.

22. The device according to claim 13, wherein the microcontroller is configured to distinguish between returned transmitting signal output and other signals received by the device based on the identifier signal.

23. The device according to claim 13, wherein the identifier signal is changeable as a function of time.

24. The device according to claim 13, wherein the identifier signal includes a modulation of the transmitting signal.

25. The device according to claim 24, wherein the modulation includes at least one of an amplitude modulation, a frequency modulation, a phase modulation, a pulse-length modulation and a mark-space modulation.

* * * * *